(12) United States Patent
Ishigo et al.

(10) Patent No.: US 8,317,402 B2
(45) Date of Patent: Nov. 27, 2012

(54) CONNECTING ROD BEARING FOR INTERNAL COMBUSTION ENGINES AND CONNECTING ROD BEARING DEVICE

(75) Inventors: Osamu Ishigo, Inuyama (JP); Atsushi Okado, Inuyama (JP)

(73) Assignee: Daido Metal Company Ltd., Naka-Ku, Nagoya (JP)

( * ) Notice: Subject to any disclaimer, the term of this patent is extended or adjusted under 35 U.S.C. 154(b) by 345 days.

(21) Appl. No.: 12/815,716

(22) Filed: Jun. 15, 2010

(65) Prior Publication Data

US 2010/0316313 A1 Dec. 16, 2010

(30) Foreign Application Priority Data

Jun. 15, 2009 (JP) .................................. 2009-142200

(51) Int. Cl.
*F16C 33/10* (2006.01)

(52) U.S. Cl. ...................................................... 384/288

(58) Field of Classification Search .................. 384/286, 384/287, 288, 291, 294, 429, 430
See application file for complete search history.

(56) References Cited

U.S. PATENT DOCUMENTS

| 4,567,815 | A | * | 2/1986 | Kocher | 384/291 |
|---|---|---|---|---|---|
| 5,009,522 | A | * | 4/1991 | Hahn | 384/288 |
| 2005/0047689 | A1 | * | 3/2005 | Yamazaki et al. | 384/288 |
| 2005/0263125 | A1 | * | 12/2005 | Terada et al. | 384/288 |
| 2010/0316312 | A1 | * | 12/2010 | Maitani et al. | 384/288 |
| 2011/0058761 | A1 | * | 3/2011 | Ishigo et al. | 384/288 |

FOREIGN PATENT DOCUMENTS

| JP | 08277831 | 10/1996 |
|---|---|---|
| JP | 2005069283 | 3/2005 |

* cited by examiner

*Primary Examiner* — Thomas R Hannon
(74) *Attorney, Agent, or Firm* — Browdy and Neimark, PLLC (57) ABSTRACT

Disclosed is a connecting rod bearing for crankshafts having a pair of semi-cylindrical bearings. Circumferential grooves (CG) on the bearing inner surface extend from each circumferential end toward the circumferential center within a maximum circumferential angle of 45 degrees and divide reduced wall thickness region into two sections. Axial grooves communicating with the CG are provided along abutted ends of the bearings. Circumferential length of the CG is larger than that of the reduced region. Depth of the CG becomes gradually smaller from the end toward the center. Width of the CG is not smaller than one-quarter of a diameter of lubricant-oil outlet of internal lubricant-oil passage in a crankpin and less than the diameter. Cross-sectional area of the CG is larger than that of the axial grooves at a connection portion thereof.

6 Claims, 7 Drawing Sheets

FIG. 13

CONNECTING ROD BEARING FOR INTERNAL COMBUSTION ENGINES AND CONNECTING ROD BEARING DEVICE

TECHNICAL BACKGROUND OF THE INVENTION

The present invention relates to a connecting rod bearing (i.e. a slide bearing) for internal combustion engines, which consists of a pair of semi-cylindrical bearings, and which rotatably supports a crankpin connecting a connecting rod and a crankshaft, wherein lubricant oil is supplied to an inner surface of a main bearing, which supports the crankshaft, and further to an inner surface of the connecting rod bearing through an internal lubricant-oil passage formed in the crankshaft.

RELATED ART

A crankshaft of an internal combustion engine is supported in a lower section of a cylinder block of the internal combustion engine at a journal section thereof through a main bearing consisting of a pair of semi-cylindrical bearings. In the main bearing, lubricant oil discharged from an oil pump is fed into an oil groove, being formed on the inner surface of the main bearing, through an oil gallery formed in the cylinder block wall and a through hole formed in the main bearing wall. A first lubricant-oil passage is diametrically formed through the journal section, and openings at the both ends of the first lubricant-oil passage are in fluid communication with the oil groove. Further, a second lubricant-oil passage is formed in the crankshaft so as to branch off from the diametrical first lubricant-oil passage in the journal section to go through a crank arm, which second lubricant-oil passage is in fluid communication with a third lubricant-oil passage diametrically formed through a crankpin. Thus, the lubricant oil fed from the oil gallery in the cylinder block wall via the through hole formed in the main bearing wall into the oil groove formed on the inner surface of the main bearing flows through the first, second and third lubricant-oil passages, and be supplied between sliding surfaces of the crankpin and a connecting rod bearing from outlet ports at both ends of the third lubricant-oil passage (which is a lubricant-oil outlet port existing on the surface of the crankpin).

The lubricant oil fed from the cylinder block of the internal combustion engine through the journal section of the crankshaft to the connecting rod bearing might carry foreign substances remaining in the respective lubricant-oil passages. If such foreign substances entrained by the lubricant oil are fed between the crankpin and the connecting rod bearing, there is a risk that the foreign substances damage the sliding surface of the connecting rod bearing. Thus, it is needed to quickly discharge the foreign substances from the sliding surface of the crankpin and the connecting rod bearing to outside.

As a countermeasure against the foreign substances accompanied with the lubricant oil, there has been a proposal to discharge the foreign substances by providing a circumferential oil groove throughout the entire circumferential length of the inner surface of one of the semi-cylindrical bearings of the main bearing which consists of a pair of the semi-cylindrical bearings and which supports the journal section of the crankshaft, the one of the semi-cylindrical bearings having a through hole which directly receives the lubricant oil supplied from the oil gallery in the cylinder block wall. When the above idea is applied to the connecting rod bearing, however, it was confirmed by an experiment that not only the foreign substance discharge effect is obtainable but also the proposed way is counterproductive since the foreign substances remain in the circumferential oil groove formed throughout the entire circumferential length of the inner surface of the semi-cylindrical bearing of the connecting rod bearing, and are dispersed throughout the sliding surface of the bearing thereby becoming liable to damage the bearing.

This is because in general a housing, which holds the connecting rod bearing, is considerably deformed during engine operation, so that a clearance between the crankpin and the connecting rod bearing during the engine operation is larger than a clearance between the journal section of the crankshaft and the main bearing, so that the foreign substances remaining in the oil groove are liable to be dispersed throughout the sliding surface of the bearing including "a circumferential center section of the semi-cylindrical bearing" as a primary load receiving section. Such a connecting rod bearing suffers increased damages as compared with a conventional connecting rod bearing without such a circumferential oil groove. This was confirmed by an experiment.

In order to discharge the foreign substances fed onto the sliding surface of the connecting rod bearing together with the lubricant oil from the lubricant-oil outlet port on the surface of the crankpin, it is assumable that a partial circumferential groove is formed in an inner surface region of the connecting rod bearing adjacent to a circumferential end of the connecting rod bearing, which end oriented to the same direction as the relative rotational direction of the crankpin thereby causing the foreign substances to be captured in the partial circumferential groove. According to such a configuration, it will be possible that the foreign substances are fed together with the lubricant oil to the vicinity of the circumferential end along the circumferential groove, where the foreign substances can be effectively discharged axially from the connecting rod bearing through a clearance between a crush relief surface and the crankpin, which crush relief is formed on the inner surface adjacent to the circumferential end region of the semi-cylindrical bearing provided with the partial circumferential groove, and, since another circumferential end of a mating semi-cylindrical bearing without a circumferential groove in an adjacent region to the circumferential end works as a barrier so as not to allow the foreign substances to move onto the sliding surface of the mating semi-cylindrical bearing.

However, in a manufacturing process of internal combustion engines, when the semi-cylindrical bearings are incorporated into a split type connecting rod housing, the semi-cylindrical bearing provided with the partial circumferential groove might be erroneously incorporated such that the circumferential end, in the vicinity of which the partial circumferential groove is provided, faces a counter direction to the relative rotational direction of the crankpin. If such an erroneous incorporation occurs, the circumferential groove will disadvantageously promote the foreign substances to move onto the sliding surface of the bearing. In this connection, manufacturers of internal combustion engines require plane-symmetrical semi-cylindrical bearings, and even if a pair of semi-cylindrical bearings have the same shape as each other, they require connecting rod bearings excellent in foreign substance discharging property.

Here we would raise the following patent publications of the related art:
1. JP-A-08-277831
2. JP-A-2005-69283

BRIEF SUMMARY OF THE INVENTION

An object of the present invention is to provide a slide bearing (i.e. a connecting rod bearing) for crankpins of internal combustion engines excellent in discharge property of foreign substances which are entrained in lubricant oil fed through an internal lubricant-oil passage of a crankshaft.

Under the above object, according to a first aspect of the present invention, there is provided the following connecting rod bearing for crankshafts of internal combustion engines.

A connecting rod bearing for crankshafts of internal combustion engines for rotatably supporting a crankpin of a crankshaft having an internal lubricant-oil passage, the connecting rod bearing consisting of a pair of semi-cylindrical bearings, one of which is an upper semi-cylindrical bearing positioned on a connecting rod side of a big end housing of a connecting rod, and the other of which is a lower semi-cylindrical bearing positioned on a cap side of the big end housing of the connecting rod, wherein the upper and lower semi-cylindrical bearings are provided with a reduced wall thickness region as a crush relief on a bearing inner surface adjacent to each of circumferential ends of the upper and lower semi-cylindrical bearings, wherein the upper semi-cylindrical bearing is so assembled to the big end housing of the connecting rod that a circumferential center of the upper semi-cylindrical bearing is aligned with an axis of the connecting rod, and wherein a circumferential groove is formed on the bearing inner surface so as to extend from each of circumferential ends of the upper and lower semi-cylindrical bearings toward the circumferential center of the bearings within a maximum circumferential angle range of 45 degrees and to divide the reduced wall thickness region into two sections, a width center line of the circumferential groove being in alignment with an opening center of a lubricant-oil outlet port of the internal lubricant-oil passage in the crankpin, which lubricant-oil outlet port exists on an outer surface of the crankpin. In this regard, it is noted that a typical cross-sectional form of the internal lubricant-oil passage is circular.

Further, in the connecting rod bearing, a corner edge of the respective circumferential end continuous to the bearing inner surface is chamfered to form a slant surface, thereby two axial grooves being in fluid communication with the four circumferential grooves are defined over an entire axial width of the upper and lower semi-cylindrical bearings along the circumferential ends abutting against each other in a state that the pair of semi-cylindrical bearings are combined with circularly, wherein a circumferential length of the circumferential groove is larger than a circumferential length of the reduced wall thickness region, wherein a depth of the circumferential groove is made gradually smaller from the circumferential end toward the circumferential center, wherein a width of the circumferential groove is not smaller than one-quarter of a diameter of the lubricant-oil outlet port of the internal lubricant-oil passage in the crankpin and less than the diameter of the lubricant-oil outlet port, and wherein cross-sectional areas of the circumferential groove and the axial groove at a connection portion thereof satisfy the following equation (1):

Cross-sectional area of the circumferential groove>cross-sectional area of the axial groove    (1)

Here is exemplified a preferable size of the axial groove:

Groove width=less than 2 mm, and

Groove depth=0.1 to 0.5 mm.

A preferable size of the reduced wall thickness region of the bearing (i.e. a crush relief region):

Circumferential length=3 to 15 mm,

Reduction thickness value based on the bearing wall thickness of the other region of the bearing=0.1 to 0.5 mm.

The term "crush relief" is defined in SAE J506 (refer to Items 3.26 and 6.4), DIN1497 (refer to §3.2), which is a reduced wall thickness region formed by removing the bearing wall close to each of the circumferential ends of a pair of semi-cylindrical bearings on the inner surface side, an inner surface of which region has "a different center of curvature from the center of curvature of the bearing inner surface in another region of the semi-cylindrical bearing including the circumferential center thereof", formed by removing the bearing wall close to each of the circumferential ends of the pair of semi-cylindrical bearings on the inner surface side (in which reduced wall thickness region the wall thickness is gradually reduced toward the circumferential end).

In one embodiment of the present invention, the depth of the circumferential groove within a circumferential length range from the circumferential end to at least one-half of the diameter of the lubricant-oil outlet port is 0.1 to 0.8 mm.

In another embodiment of the present invention, the length of the circumferential groove satisfies the following equation (2):

Circumferential length of the circumferential groove≧circumferential length of the wall thickness reduced region+one-half of the diameter of the lubricant-oil outlet port    (2)

In still another embodiment of the present invention, the width of the circumferential groove satisfies the following equation (3):

One-half of the diameter of the lubricant-oil outlet port>width of the circumferential groove≧one-quarter of the diameter of the lubricant-oil outlet port    (3)

In still another embodiment of the present invention, a bottom of the circumferential groove has an arc shape in cross section, and the width of the circumferential groove is made gradually smaller from the circumferential end toward the circumferential center of the semi-cylindrical bearing, and is not less than one-quarter of and less than one-half of the diameter of the lubricant-oil outlet port at a position distant by one-half of the diameter of the lubricant-oil outlet port from a groove end on the circumferential center side toward the circumferential end side.

According to a second aspect of the present invention, there is provided the following connecting rod bearing device for internal combustion engines.

A connecting rod bearing device for internal combustion engines comprising a connecting rod bearing rotatably supporting a crankpin which connects a connecting rod of an internal combustion engine to a crankshaft having an internal lubricant-oil passage, and a big end housing of the connecting rod for holding the connecting rod bearing, the connecting rod bearing consisting of a pair of semi-cylindrical bearings, one of which is an upper semi-cylindrical bearing positioned on a connecting rod side of the big end housing of the connecting rod, and the other of which is a lower semi-cylindrical bearing positioned on a cap side of the big end housing of the connecting rod, wherein the upper and lower semi-cylindrical bearings are provided with a reduced wall thickness region as a crush relief on a bearing inner surface adjacent to each of circumferential ends of the upper and lower semi-cylindrical bearings, wherein the upper semi-cylindrical bearing is so assembled to the big end housing of the connecting rod that a circumferential center of the upper semi-cylindrical bearing is aligned with an axis of the connecting rod, and wherein a circumferential groove is formed on the bearing inner surface so as to extend from each of circumferential ends of the upper and lower semi-cylindrical bearings toward the circumferential center of the bearings within a maximum circumferential angle range of 45 degrees and to divide the reduced wall thickness region into two sections, a width center line of the circumferential groove being in alignment with an opening center of a lubricant-oil outlet port of the internal lubricant-oil passage in the crankpin, which lubricant-oil outlet port exists on an outer surface of the crankpin, wherein a corner edge of the respective circumferential end continuous to the bearing inner surface is chamfered to form a slant surface, thereby two axial grooves being in fluid communication with the four circumferential grooves are defined over an entire axial width of the upper and lower semi-cylindrical bearings along the circumferential ends abutting against each other in a state that the pair of semi-cylindrical bearings are combined with circularly, wherein a circumferential length of the circumferential groove is larger than a circumferential length of the reduced wall thickness region, wherein a depth of the circumferential groove is made gradually smaller from the circumferential end toward the circumferential center, wherein a width of the circumferential groove is not smaller than one-quarter of a diameter of the lubricant-oil outlet port of the internal lubricant-oil passage in the crankpin and less than the diameter of the lubricant-oil outlet port, and wherein cross-sectional areas of the circumferential groove and the axial groove at a connection portion thereof satisfy the following equation (1):

$$\text{Cross-sectional area of the circumferential groove} > \text{cross-sectional area of the axial groove} \qquad (1)$$

(1) According to the present invention, the circumferential groove is formed on the bearing inner surface adjacent to each of the circumferential ends of the upper and lower semi-cylindrical bearings within the maximum circumferential angle range of 45 degrees from the circumferential end toward the circumferential center so as to divide the reduced wall thickness region (i.e. the crush relief region) into the two sections. During operation of the engine, lubricant oil fed through the internal lubricant-oil passage, which leads from a journal section of the crankshaft to a diametrical through hole formed in the crankpin, is supplied between the crankpin and the connecting rod bearing from the lubricant-oil outlet port existing on the surface of the crankpin, and flows along the circumferential groove toward the circumferential end of the semi-cylindrical bearing in the rotational direction of the crankpin together with foreign substances entrained in the lubricant oil.

(2) In the connecting rod bearing of the present invention, the corner edge of each of the circumferential ends continuous to the bearing inner surface is chamfered to form the slant surface, thereby the two axial grooves being in fluid communication with the four circumferential grooves are defined over an entire axial width of the upper and lower semi-cylindrical bearings along the circumferential ends abutting against each other in a state that the pair of semi-cylindrical bearings are combined with circularly.

Thus, the foreign substances, which have moved along the circumferential groove together with the lubricant oil and reached the circumferential end region, change their moving direction at an almost right angle to flow into the axial groove which is in fluid communication with the circumferential groove, and are discharged to outside of the connecting rod bearing from the both ends of the axial groove together with the lubricant oil. It should be noted that since the cross-sectional areas of the circumferential and axial grooves at the connection portion thereof have the relationship expressed by the equation "cross-sectional area of the circumferential groove>cross-sectional area of the axial groove", the flow rate of the lubricant oil flowing into the axial groove from the circumferential groove increases, so that the foreign substances entering the axial groove are promoted to move and be discharged.

(3) In the present invention, the circumferential length of the circumferential groove is larger than the circumferential length of the reduced wall thickness region (i.e. the crush relief region), and the width of the circumferential groove is not smaller than one-quarter of a diameter of the lubricant-oil outlet port of the internal lubricant-oil passage in the crankpin and less than the diameter of the lubricant-oil outlet port. According to such a configuration, by the relative rotation of the crankpin to the connecting rod bearing, the lubricant-oil outlet port of the crankpin passes across the axial groove and moves into the region of the mating semi-cylindrical bearing, and further moves along the circumferential groove (hereafter merely referred to as a second circumferential groove) of the mating semi-cylindrical bearing and passes through the end of the second circumferential groove toward the circumferential center of the mating semi-cylindrical bearing. During the movement of the lubricant-oil outlet port, the lubricant oil discharged from the port into the second circumferential groove flows in a forward direction (i.e. the moving direction of the lubricant-oil outlet port) until the lubricant-oil outlet port reaches the end of the second circumferential groove. However, from when the lubricant-oil outlet port reaches the end of the second circumferential groove until when the lubricant-oil outlet port passes through the end, there occurs a phenomenon that the lubricant oil flows in a backward direction in the second circumferential groove. Thus, even if there are foreign substances moving across the axial groove to enter the second circumferential groove without flowing into the axial groove together with the lubricant oil from the circumferential groove of the initial semi-cylindrical bearing to the second circumferential groove, and moving toward the end region of the second circumferential groove and remaining there, those foreign substances will be returned toward the axial groove which they previously traversed by the lubricant oil flowing in the reverse direction. This is a sweeping off effect for remaining foreign substances. Thus, the paired circumferential grooves in communication with each other via the axial groove when the pair of semi-cylindrical bearings cooperate to display a foreign substance discharge function.

(4) The above advantages are obtainable under the conditions that "the circumferential length of the circumferential groove is larger than the circumferential length of the reduced wall thickness region (i.e. the crush relief region), and the width of the circumferential groove is not smaller than one-quarter of a diameter of the lubricant-oil outlet port of the internal lubricant-oil passage in the crankpin and less than the diameter of the lubricant-oil outlet port". If the circumferential length of the circumferential groove is equal to or less than the circumferential length of the reduced wall thickness region, the reverse flow phenomenon of the lubricant oil occurred by the relationship between a position of the lubricant-oil outlet port and the end of the second circumferential groove is not expectable, and the pressure of the lubricant oil discharged from the lubricant-oil outlet port is released through a clearance between the reduced wall thickness region (i.e. the crush relief region) and the crankpin. As a result, the lubricant oil is diffused from the second circumferential groove to a bearing sliding surface region, and the foreign substances remaining in the second circumferential groove move to the bearing sliding surface region together with the lubricant oil to roll between the connecting rod bearing and the crankpin, thereby disadvantageously the surfaces of these members will be damaged. On the other hand, since the flow rate of the lubricant oil in the second circumferential groove is reduced due to the reverse flow phenomenon, the capacity to convey the foreign substances still remaining in the second circumferential groove toward the axial groove by the lubricant oil is also reduced, so that the foreign substance discharging capacity is deteriorated.

(5) When the depth of the circumferential groove is made to be 0.1 to 0.8 mm within a circumferential length range from the circumferential end of the semi-cylindrical bearing to at least one-half of the diameter of the lubricant-oil outlet port, the foreign substances entrained in the lubricant oil supplied between the crankpin and the connecting rod bearing from the lubricant-oil outlet port on the outer surface of the crankpin easily enter into the circumferential groove. While foreign substances having a maximum length size of about 0.1 mm may be entrained in the lubricant oil, since there is formed a region having a depth of not less than 0.1 mm and having a circumferential length not less than the circumferential length corresponding to the diameter of the lubricant-oil outlet port in a communication portion between the first and second circumferential grooves, it is possible for even foreign substances having a large size to enter into the circumferential groove. If the depth of the circumferential groove is too large, a volume of the circumferential groove increases, so that the reverse flow rate of the lubricant oil flowing in the second circumferential groove is reduced. In order to prevent the reduction of the reverse flow rate, preferably the circumferential groove has a depth of not more than 0.8 mm.

(6) When the width of the circumferential groove is made less than one-half of the diameter of the lubricant-oil outlet port, the flow rate of the lubricant oil flowing in the reverse direction through the circumferential groove is further increased advantageously.

(7) When the circumferential length of the circumferential groove is made to be not less than a value of "circumferential length of the reduced wall thickness region+one-half of the diameter of the lubricant-oil outlet port", since the lubricant-oil outlet port does not open to (or is not in communication with) the clearance between the reduced wall thickness region (i.e. the crush relief region) and the crankpin from when the lubricant-oil outlet port reaches the end of the second circumferential groove until when the lubricant-oil outlet port passes through the end, and the pressure of the lubricant oil is hardly released from the circumferential groove, it is possible to increase the flow rate of the reverse lubricant oil flow occurred in the second circumferential groove.

(8) In the present invention, since the foreign substances entrained in the lubricant oil can be discharged to outside of the bearing through the circumferential groove and the axial groove in communication with each other, it is not necessary to enlarge the clearance between the crush relief and the crank journal to allow the foreign substances to easily pass through the clearance to be discharged as disclosed in JP-A-2005-69283. According to the configuration of the present invention, it is enough only to make the bearing wall thickness of the circumferential end region smaller (i.e. thinner) by about 0.010 to 0.050 mm relative to the bearing wall thickness of the circumferential center of the semi-cylindrical bearing in a similar manner to a conventional slide bearing for crankshafts, thereby enabling to form a small clearance between the connecting rod bearing and the crankpin by the reduced wall thickness region (i.e. the crush relief region) so that it is possible to restrain an increase in lubricant oil leakage through the clearance.

DETAILED DESCRIPTION OF THE INVENTION

Herein below, referring to the accompanying drawings, there will be provided a description of some embodiments of the present invention.

Figure 1:
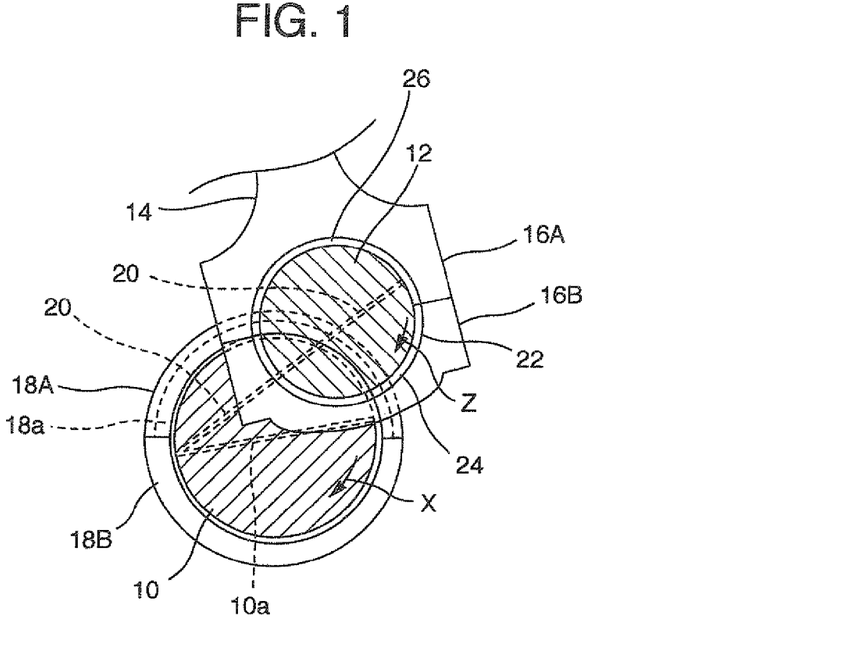
FIG. 1 is a schematic view showing a crankshaft of an internal combustion engine sectioned in a journal section and a crankpin, respectively.

FIG. 1 is a schematic view of a crankshaft of an internal combustion engine sectioned in a journal section and a crankpin section, respectively, in which 10 denotes a journal, 12 a crankpin and 14 a connecting rod. With regard to a positional relationship among these three members in the vertical direction to the drawing sheet, the journal 10 is present in most backside of the drawing sheet, and the crankpin 12 is present in front side of the drawing sheet, wherein the crankpin 12 is surrounded by a big end housing 16 of the connecting rod 14 which carries a piston on the other end.

The journal 10 is supported in a lower portion of a cylinder block of the internal combustion engine through a pair of semi-cylindrical bearings 18A and 18B. The semi-cylindrical bearing 18A positioned on the upper side in the drawing is provided with an oil groove 18a on the inner surface throughout the circumferential entire length of the bearing 18A.

The journal 10 has a diametrically formed through hole 10a. When the journal 10 rotates in the direction of the arrow X, openings at the both ends of the through hole 10a alternately communicates with the oil groove 18a.

A lubricant-oil passage 20 is formed in the crankshaft through the journal 10, a crank arm (not-shown) and the crankpin 12.

The crankpin 12 is held in the big end housing (which consists of a big end housing 16A on the connecting rod side and another big end housing 16B on the cap side) of the connecting rod 14 through a pair of semi-cylindrical bearings 24 and 26. The semi-cylindrical bearings 24 and 26 are assembled by abutting circumferential ends thereof with each other to form a cylindrical connecting rod bearing 22.

Embodiment 1

Figure 2:
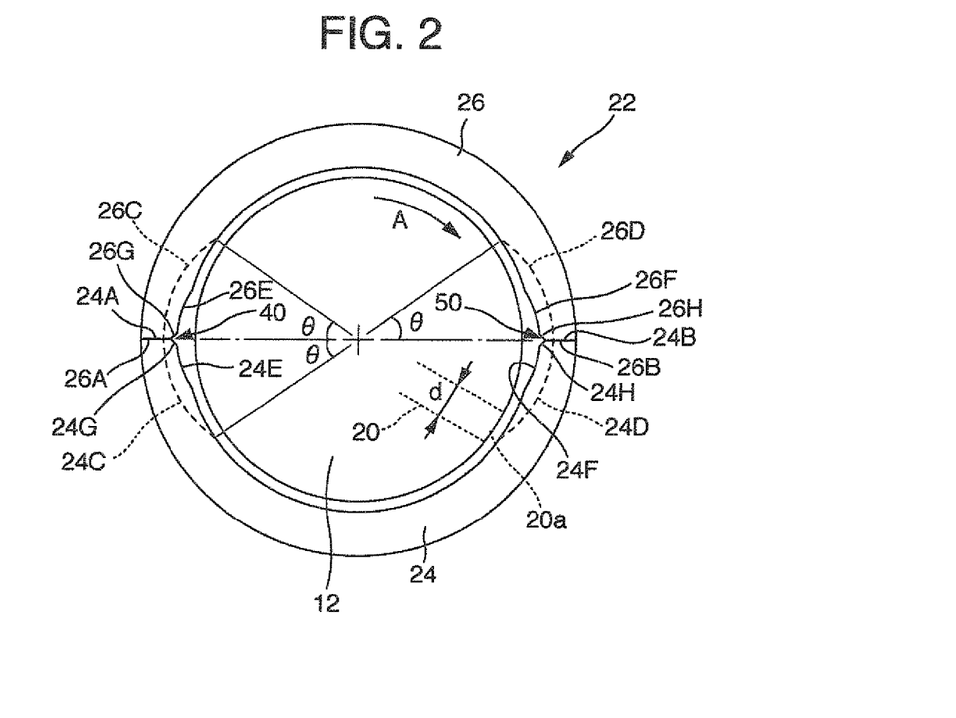
FIG. 2 is an elevation view of a connecting rod bearing according to one embodiment of the present invention.
Figure 3:
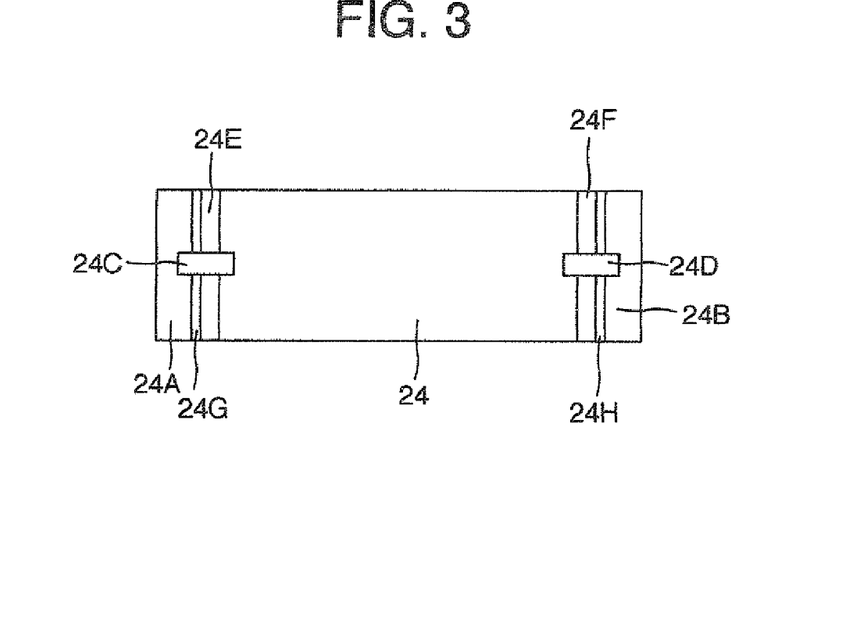
FIG. 3 is a plan view of an inner surface of a semi-cylindrical bearing that is a half body of the connecting rod bearing shown in FIG. 2.
Figure 4:
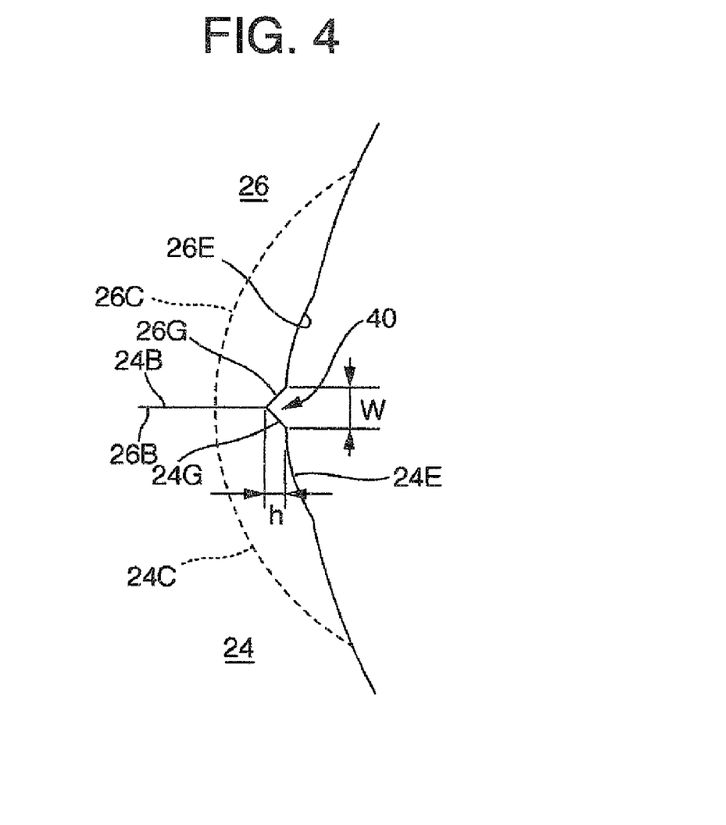
FIG. 4 is a local enlarged view of the connecting rod bearing shown in FIG. 2.

FIGS. 2 to 4 show the semi-cylindrical bearings 24 and 26 constituting the connecting rod bearing 22 in detail. Since the semi-cylindrical bearings 24 and 26 have the same form as each other, the form of only one of the semi-cylindrical bearings will be explained.

The semi-cylindrical bearing 24 is of a symmetrical member in the drawing.

Circumferential Groove:

Circumferential grooves 24C and 24D for lubricant oil having a rectangular shape in cross section are formed on the inner surface of the semi-cylindrical bearing 24, which extend from circumferential ends 24A and 24B of the semi-cylindrical bearing 24 toward the circumferential center of the semi-cylindrical bearing 24. Width center lines of the circumferential grooves 24C and 24D are in alignment with the width center line of the semi-cylindrical bearing 24, and with the opening center of a lubricant-oil outlet port 20a (i.e. the outlet port of the lubricant-oil passage 20) existing on the surface of the crankpin 12. The circumferential grooves 24C and 24D are formed within a maximum circumferential angle range of 45 degrees from the circumferential ends 24A and 24B toward the circumferential center (see the angle θ in FIG. 2). The circumferential length of each of the circumferential grooves 24C and 24D is larger than the circumferential length of a reduced wall thickness region (i.e. a crush relief region) explained below. The depth thereof is made gradually smaller from each of the circumferential ends 24A and 24B toward the circumferential center. The groove width is not less than one-quarter of the diameter (d) of the lubricant-oil outlet port 20a (i.e. the outlet port of the lubricant-oil passage 20) existing on the outer surface of the crankpin 12 and less than the diameter (d). Although the circumferential grooves 24C and 24D have a rectangular shape in cross section in the present embodiment, the present invention is not limited thereto. The circumferential grooves 24C and 24D may have an inverted trapezoidal shape in cross section wherein the both side surfaces of the circumferential groove are slanted such that the groove width decreases toward the groove bottom.

Reduced Wall Thickness Region (i.e. Crush Relief Region):

Reduced wall thickness region (i.e. crush relief regions) 24E and 24F are formed on the bearing inner surface, which extend from positions close to the circumferential ends 24A and 24B of the semi-cylindrical bearing 24 toward the circumferential center of the semi-cylindrical bearing 24 in a similar manner to a conventional slide bearing for crankshafts. The circumferential length of each of the reduced wall thickness regions 24E and 24F is smaller than the circumferential length of each of the circumferential grooves 24C and 24D. Since the reduced wall thickness regions (i.e. the crush relief regions) 24E and 24F are formed on the inner surface of the semi-cylindrical bearing 24 throughout the entire width thereof, they are respectively divided into two sections by the circumferential grooves 24C and 24D (see FIG. 3).

The following is a dimensional example of the reduced wall thickness regions 24E and 24F:
 a circumferential length: 3 to 15 mm, and
 a reduction thickness value at the circumferential end section on the basis of the bearing wall thickness at the circumferential center: 0.01 to 0.05 mm.

Axial Groove:

The corner edges of the circumferential ends 24A and 24B continuous to the bearing inner surface are chamfered to form slant surfaces 24G and 24H. The slant surfaces 24G and 24H respectively define axial grooves 40 and 50 in cooperation with corresponding slant surfaces 26G and 26H of the mating semi-cylindrical bearing 26. The axial grooves 40 and 50 are formed over the entire width of the semi-cylindrical bearings 24 and 26. The axial grooves 40 and 50 are respectively in communication with the circumferential grooves 24C and 24D at the width center of the semi-cylindrical bearings 24 and 26 (FIG. 3). In the axial grooves 40 and 50, the cross-sectional areas in communication portions with the circumferential grooves 24C and 24D are configured to satisfy the relationship expressed by the equation "the cross-sectional area of the circumferential groove>the cross-sectional area of the axial groove".

Figure 5:
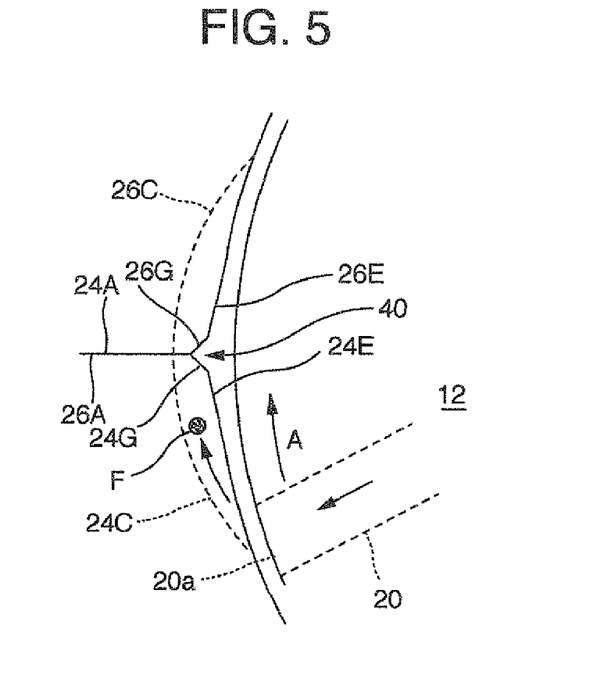
FIG. 5 is a function explanatory view of the connecting rod bearing shown in FIG. 2.

In the aforementioned configuration, during operation of the internal combustion engine, the crankpin 12 supported on the connecting rod bearing 22 rotates in the direction of the arrow A in FIG. 2 relative to the connecting rod bearing. Along with the rotation of the crankpin 12, the lubricant-oil outlet port 20a present on the outer surface of the crankpin 12 moves toward the circumferential end 24A of the semi-cylindrical bearing 24. Lubricant oil is continuously discharged from the lubricant-oil outlet port 20a through the lubricant-oil passage 20 during the movement. When the lubricant-oil outlet port 20a reaches the position of the circumferential groove 24C, the lubricant oil directly flows into the circumferential groove 24C (FIG. 5). The lubricant oil flowing into the circumferential groove 24C flows toward the axial groove 40 together with accompanying foreign substances F. When reaching the communication portion between the circumferential groove 24C and the axial groove 40, the lubricant oil changes its direction together with the foreign substances F, flows along the axial groove 40, and is discharged to outside of the bearing from the axial end portion of the connecting rod bearing 22 (the end portion in the width direction of the bearing).

The depth of the circumferential groove 24C is made gradually larger from the circumferential center side toward the circumferential end 24A. Also, in the axial groove 40, the cross-sectional area in the communication portion with the circumferential groove 24C is configured to satisfy the relationship that the cross-sectional area of the circumferential groove>the cross-sectional area of the axial groove. Accordingly, the flow velocity of the lubricant oil flowing through the circumferential groove 24C is gradually decreased from the circumferential center side toward the circumferential end 24A. After the lubricant oil enters the axial groove 40, the flow velocity thereof is increased again, and the lubricant oil is discharged to outside of the bearing with the increasing flow velocity. The change in flow velocity of the lubricant oil is advantageous in two points. That is, (1) it is possible to mitigate the tendency that the foreign substances accompanying the lubricant oil flowing through the circumferential groove 24C cross over the axial groove 40 to enter a circumferential groove 26C of the other semi-cylindrical bearing 26 by the action of inertia, to thereby allow the foreign substances to smoothly enter the axial groove 40, and (2) the foreign substances entering the axial groove 40 are smoothly discharged to outside of the bearing rapidly by accompanying the lubricant oil whose flow velocity is increased in the axial groove 40 and in a state in which the foreign substances are hardly affected by the flow of the lubricant oil in the circumferential direction along the bearing inner surface.

The lubricant oil partially passes through the axial groove 40 together with a part of the foreign substances to flow into the circumferential groove 26C of the other semi-cylindrical bearing 26, and flows toward the circumferential end portion of the circumferential groove 26C positioned on the arrow A direction side. At this point, the foreign substances F may also partially pass through the axial groove 40 to flow into the circumferential groove 26C together with the lubricant oil.

Figure 6:
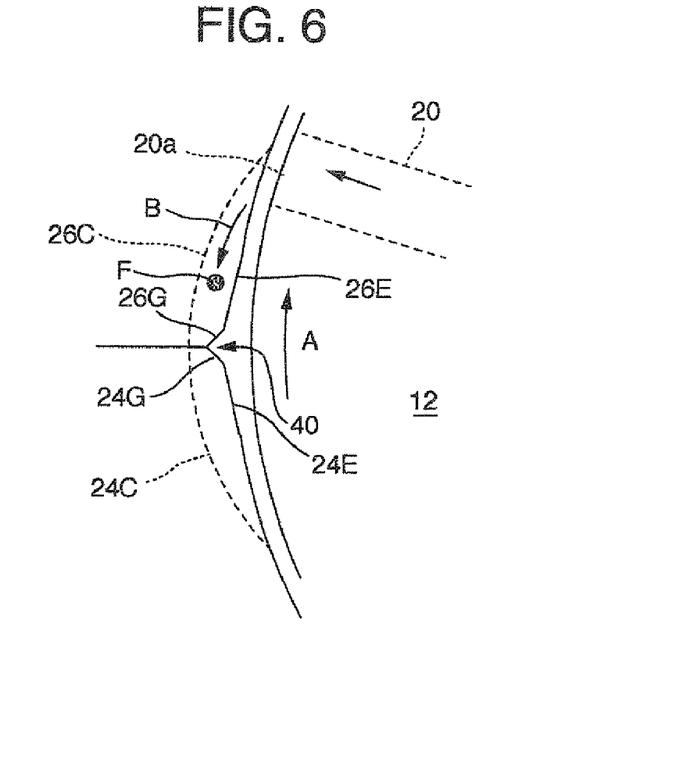
FIG. 6 is a function explanatory view similar to FIG. 5 of the connecting rod bearing shown in FIG. 2.

In a state shown in FIG. 6 in which the lubricant-oil outlet port 20a reaches the position of the end portion of the circumferential groove 26C, the lubricant-oil outlet port 20a is partially closed by the inner surface (the bearing sliding surface) of the semi-cylindrical bearing 26. The lubricant oil discharged from the lubricant-oil outlet port 20a flows into the circumferential groove 26C as a jet flow, and thereby generates a backward flow (i.e. a flow in the direction of the arrow B) relative to the previous flow in the forward direction to swiftly wash away the foreign substances F remaining in the circumferential groove 26C toward the axial groove 40 (see the arrow B in FIG. 6). Due to the generation of the backward flow, the foreign substances F possibly remaining in the circumferential groove 26C are more likely to flow toward the axial groove 40 together with the lubricant oil, and be discharged to outside of the bearing through the axial groove 40 (for the above description, see the above Item (3). To enable the backward flow phenomenon, the circumferential length of the circumferential groove 26C needs to be larger than "the circumferential length of the reduced wall thickness region (i.e. the crush relief region)". If the condition is not satisfied, the end portion of the circumferential groove 26C is positioned within the circumferential length range of the reduced wall thickness region, and the lubricant oil discharged from the lubricant-oil outlet port 20a flows in a diffused manner in the width direction (the axial direction) of the semi-cylindrical bearing 26 through a relatively large clearance between the outer surface of the crankpin 12 and the inner surface of the semi-cylindrical bearing 26 (i.e. the inner surface of the reduced wall thickness region) at a position where the circumferential groove 26C is not present.

Embodiment 2

Figure 7:
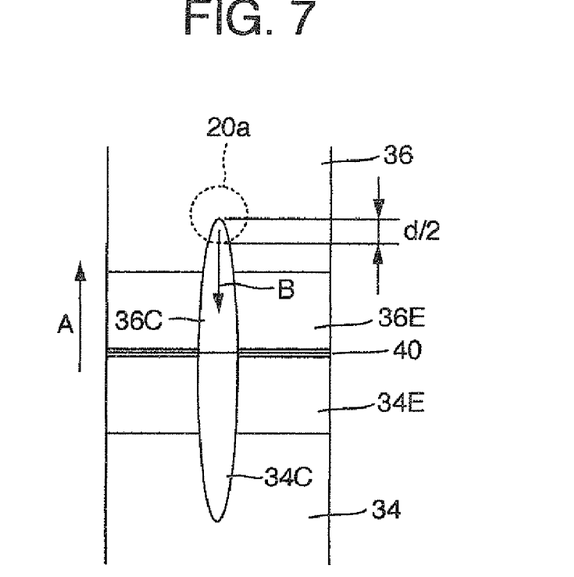
FIG. 7 is shows another embodiment of the invention connecting rod bearing as a function explanatory view of a portion where a pair of half bodies of the connecting rod bearing are combined as viewed from a bearing inner surface side of the bearing.

FIG. 7 illustrates a modification of the semi-cylindrical bearings 24 and 26. The modified semi-cylindrical bearings 34 and 36 are different from the semi-cylindrical bearings 24 and 26 in the shape of the circumferential groove. In circumferential grooves 34C and 36C of the semi-cylindrical bearings 34 and 36, the groove bottom surface has an arc shape in cross section. The groove width is made gradually smaller from each of the circumferential ends of the semi-cylindrical bearings 34 and 36 toward the circumferential center, and becomes smallest at the end on the circumferential center side. The groove width needs to be smaller than the diameter (d) of the lubricant-oil outlet port 20a of the crankpin 12 at a position away a distance equal to one-half ($=d/2$) of the diameter (d) of the lubricant-oil outlet port 20a from the end. As the groove width of the circumferential groove is smaller, the velocity of the lubricant oil flowing in the backward direction (the arrow B) from the lubricant-oil outlet port 20a into the circumferential groove 36C when the lubricant-oil outlet port 20a passes through the end position of the circumferential groove 36C along with the relative rotation of the crankpin 12 can be increased. More preferably, the groove width is not less than d/4 and less than d/2.

The groove width of each of the circumferential grooves 34C and 36C in a portion where the groove width is largest, that is, in the butt end region between the semi-cylindrical bearings 34 and 36, is also preferably smaller than the diameter (d) of the lubricant-oil outlet port 20a in a similar manner to explained above. Note that the groove width of the circumferential groove is suggested to be not less than d/4 in order to capture the foreign substances (i.e. the foreign substances discharged from the lubricant-oil outlet port 20a) in the circumferential groove positioned on the counter side of the relative rotational direction of the crankpin 12.

In both the embodiments, the width center line of the circumferential groove needs to be aligned with the opening center (i.e. the hole center) of the lubricant-oil outlet port present on the surface of the crankpin.

Herein below, there will be discussed about the relationship between the groove width of the circumferential groove and the diameter (d) of the lubricant-oil outlet port 20a, and the relationship between the circumferential length of the circumferential groove and the circumferential length of the reduced wall thickness region.

Figure 8:
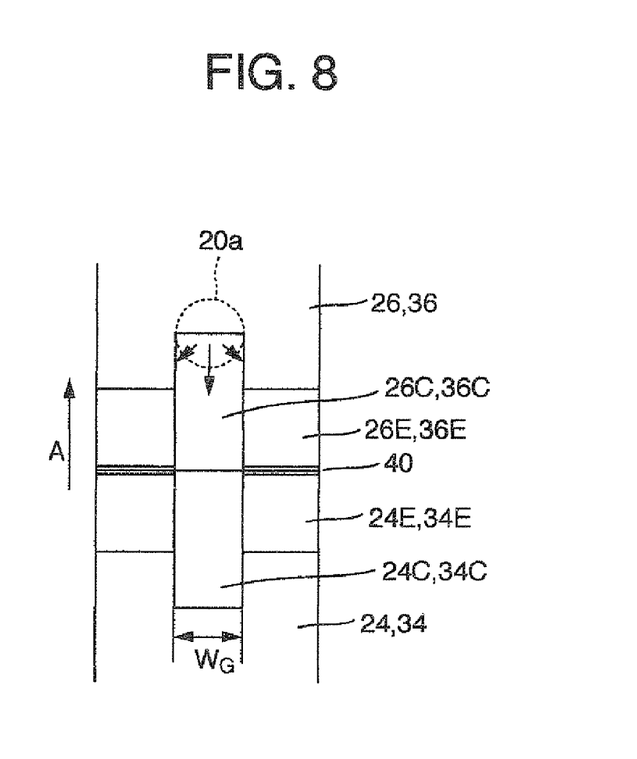
FIG. 8 is a function explanatory view of a portion where a pair of half bodies of the connecting rod bearing shown in FIG. 2 are combined as viewed from a bearing inner surface side of the bearing.

Relationship Between the Groove Width of the Circumferential Groove and the Diameter (d) of the Lubricant-Oil Outlet Port 20a (FIGS. 8 and 9):

In the present invention, the groove width ($W_G$) of the circumferential groove (24C, 34C, 26C, 36C) is less than the diameter (d) of the lubricant-oil outlet port. When the lubricant-oil outlet port of the crankpin passes through the end portion of the circumferential groove along with the relative rotation of the crankpin, a lubricant oil flow component in the bearing axial direction is also generated in the circumferential groove, to thereby reduce the momentum of a lubricant oil flow component in the circumferential direction (i.e. a backward flow component) (FIG. 8). Taking into consideration the relationship between the axial flow and the circumferential flow, the relationship expressed by the equation "the groove width (W)≧the diameter (d) of the lubricant-oil outlet port" is not preferable.

Figure 9:
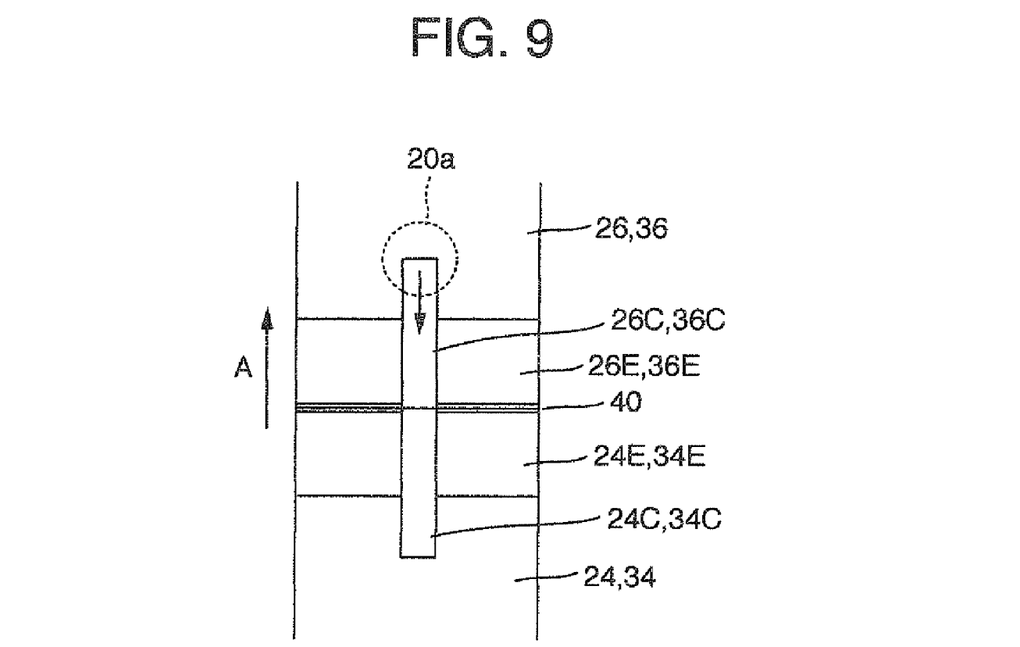
FIG. 9 is a function explanatory view similar to FIGS. 7 and 8 according to still another embodiment of the present invention.

In an embodiment shown in FIG. 9, the groove width (W) of the circumferential groove (26C, 36C) is smaller than the diameter (d) of the lubricant-oil outlet port. The backward lubricant oil flow generated in the circumferential groove when the lubricant-oil outlet port of the crankpin passes through the end portion of the circumferential groove along with the relative rotation of the crankpin includes only the lubricant oil flow component in the circumferential direction. Note that the groove width of the circumferential groove needs to be not less than d/4 to capture the foreign substances (i.e. the foreign substances discharged from the lubricant-oil outlet port 20a) in the circumferential groove positioned on the back side in the relative rotational direction of the crankpin.

Figure 10:
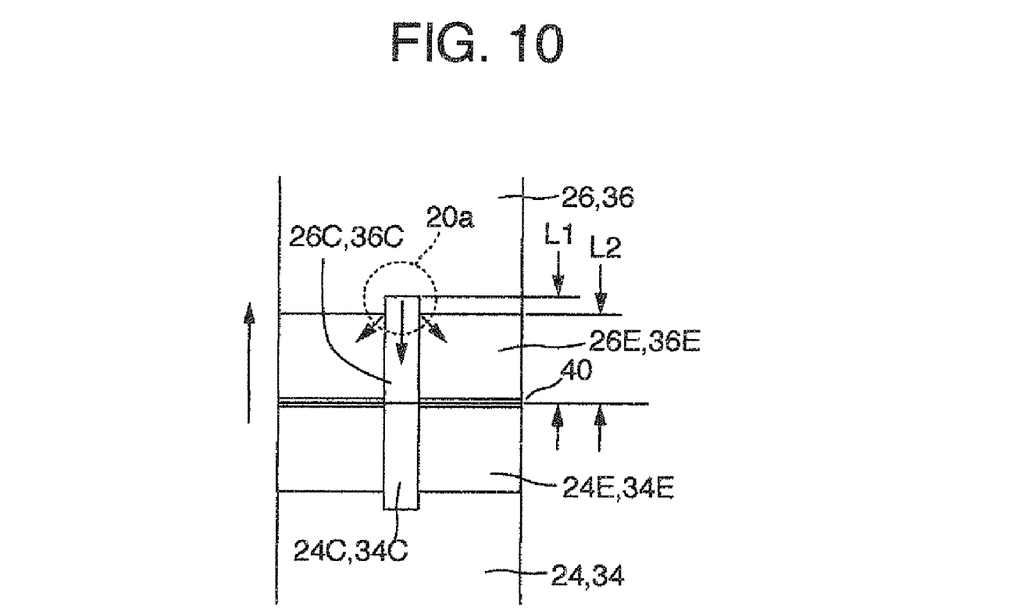
FIG. 10 is a function explanatory view similar to FIGS. 8 and 9 according to still another embodiment of the present invention.

Relationship Between the Circumferential Length of the Circumferential Groove and the Circumferential Length of the Reduced Wall Thickness Region (FIGS. 10 and 11):

(1) In the present invention, the circumferential length of the circumferential groove is larger than the circumferential length of the reduced wall thickness region. In an example shown in FIG. 10, the circumferential length (L1) of the circumferential groove is slightly larger than the circumferential length (L2) of the reduced wall thickness region. In this case, when the lubricant-oil outlet port of the crankpin passes through the end portion of the circumferential groove along with the relative rotation of the crankpin, a part of the lubricant-oil outlet port overlaps the reduced wall thickness region. Thus, the discharged lubricant oil partially flows in the bearing axial direction through a relatively large clearance between the bearing inner surface and the crankpin in the reduced wall thickness region (by virtue of the lubricant oil flow component in the bearing axial direction). Meanwhile, since the center portion of the lubricant-oil outlet port of the crankpin overlaps the circumferential groove, a relatively large lubricant oil flow component toward the circumferential groove is generated. Thus, the backward lubricant oil flow is expected to be generated although its momentum is relatively small.

Figure 11:
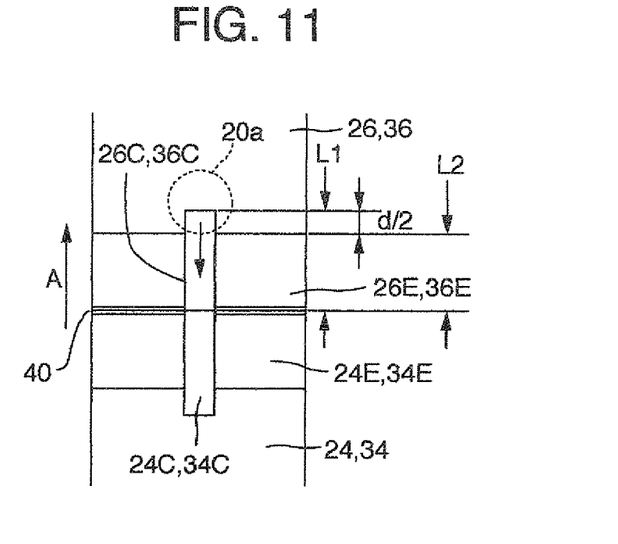
FIG. 11 is a function explanatory view similar to FIGS. 8 and 9 according to still another embodiment of the present invention.

In one embodiment shown in FIG. 11, the circumferential length (L1) of the circumferential groove is larger than the circumferential length (L2) of the reduced wall thickness region by one-half (=d/2) of the diameter of the lubricant-oil outlet port. Thus, when the lubricant-oil outlet port of the crankpin passes through the end portion of the circumferential groove along with the relative rotation of the crankpin, the lubricant-oil outlet port does not overlap the reduced wall thickness region. The lubricant oil discharged form the lubricant-oil outlet port flows only into the circumferential groove, so that the backward flow at a high velocity is generated due to the lubricant oil flow component in the circumferential direction.

Figure 12:
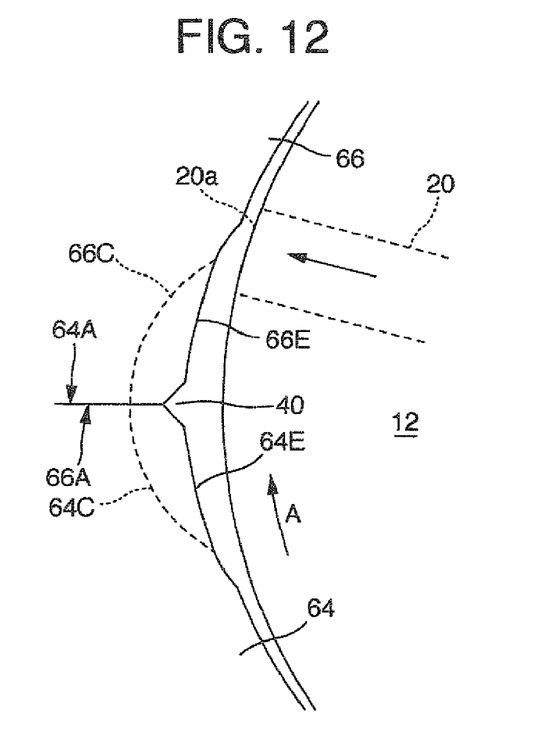
FIG. 12 is a function explanatory view similar to FIGS. 5 and 6 according to a comparative example.
Figure 13:
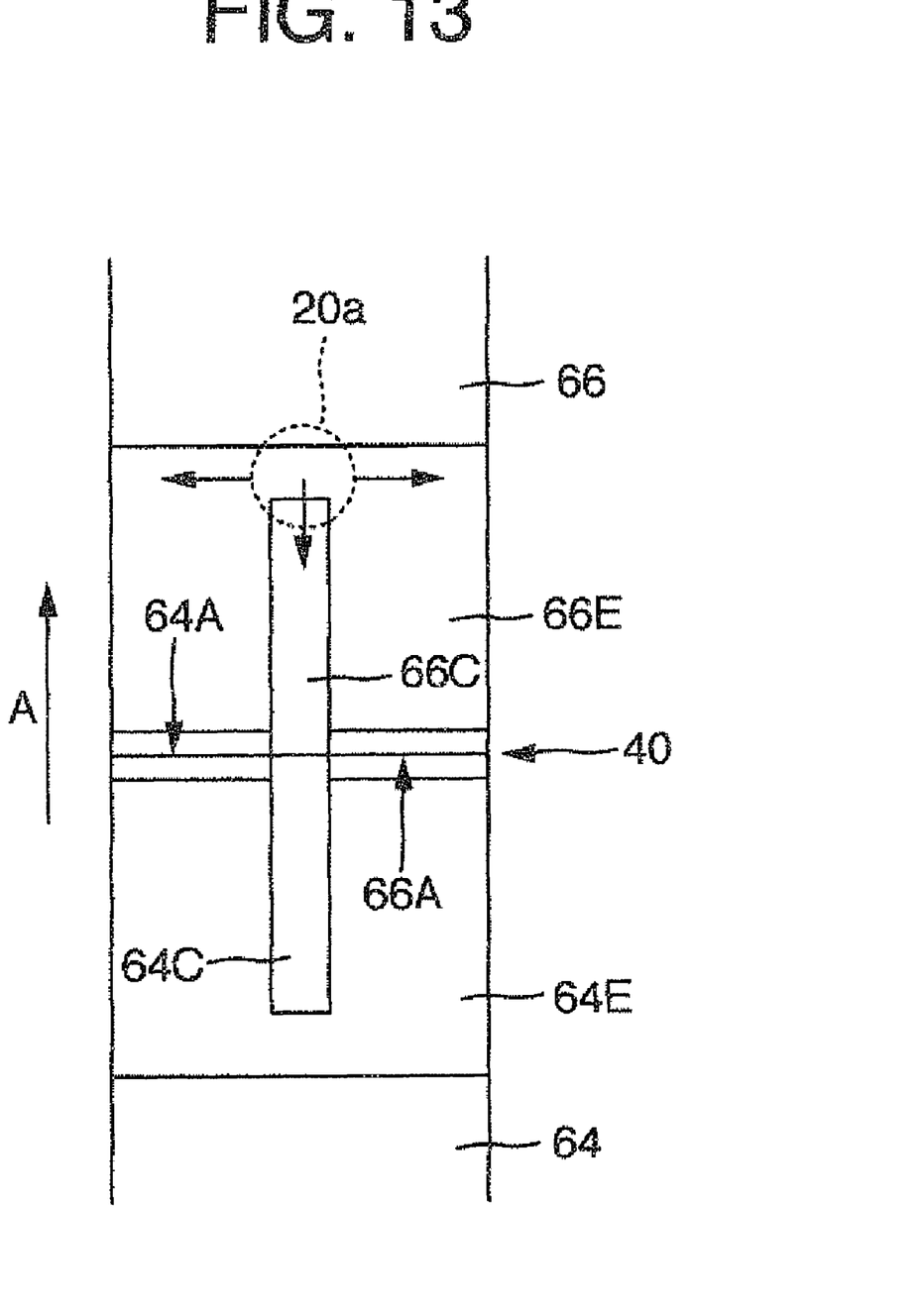
FIG. 13 is a function explanatory view similar to FIGS. 8 to 11 according to the comparative example shown in FIG. 12.

(2) Here there will be discussed about a comparative example in which the circumferential length of the circumferential groove is smaller than the circumferential length of the reduced wall thickness region (FIGS. 12 and 13). In the comparative example, semi-cylindrical bearings 64 and 66 are combined to constitute the connecting rod bearing. Circumferential grooves 64C and 66C for lubricant oil and reduced wall thickness regions 64E and 66E are formed on the inner surfaces of the semi-cylindrical bearings 64 and 66. The axial groove 40 is present at the butt end position between the semi-cylindrical bearings 64 and 66. The connecting rod bearing according to the comparative example is different from those of the embodiments of the present invention in that the circumferential length of each of the circumferential grooves 64C and 66C from the circumferential ends of the semi-cylindrical bearings 64 and 66 is smaller than the circumferential length of each of the reduced wall thickness regions 64E and 66E. A large portion of the lubricant-oil outlet port 20a overlaps the reduced wall thickness region 66E outside the circumferential groove 66C when the lubricant-oil outlet port 20a of the crankpin 12 passes through the end portion of the circumferential groove 66C along with the relative rotation of the crankpin 12 (see the arrow A) as shown the drawing. Thus, the discharged lubricant oil mostly flows in the bearing axial direction (the horizontal direction in FIG. 13) through the relatively large clearance between the bearing inner surface and the crankpin 12 in the reduced wall thickness region 66E. The foreign substances remaining in the circumferential groove 66C enter between the bearing sliding surface and the crankpin 12 due to the flow in the bearing axial direction, thereby damaging the sliding surfaces of the connecting rod bearing and the crankpin 12. Meanwhile, a small portion of the discharged lubricant oil flows into the circumferential groove 66C. However, a pressure large enough to generate the backward flow in the circumferential groove 64C is not obtainable.

LIST OF COMPONENTS

10: a crank journal, 10a: a diametrical through hole of the crank journal, 12: a crankpin, 14: a connecting rod, 16A: a big end housing on the connecting rod side, 16B: another big end housing on the cap side, 18A: a semi-cylindrical bearing, 18B: a semi-cylindrical bearing, 18a: an oil groove, 20: a lubricant-oil passage, 20a: a lubricant-oil outlet port, 22: a connecting rod bearing, 24: a semi-cylindrical bearing, 24A: a circumferential end, 24B: a circumferential end, 24C: a circumferential groove, 24D: a circumferential groove, 24E: a reduced wall thickness region (i.e. a crush relief region), 24F: a reduced wall thickness region (i.e. a crush relief region), 24G: a slant surface, 24H: a slant surface, 26: a semi-cylindrical bearing, 26A: a circumferential end, 26B: a circumferential end, 26C: a circumferential groove, 26D: a circumferential groove, 26E: a reduced wall thickness region (i.e. a crush relief region), 26F: a reduced wall thickness region (i.e. a crush relief region), 26G: a slant surface, 26H: a slant surface, 34: a semi-cylindrical bearing, 34C: a circumferential groove, 36: a circumferential groove, 36C: a circumferential groove, 40: an axial groove, 50: an axial groove, 64: a semi-cylindrical bearing, 64A: a circumferential end, 64C: a circumferential groove, 66: a circumferential groove, 66A: a circumferential end, 64C: a circumferential groove, 64E: a reduced wall thickness region (i.e. a crush relief region), d: a diameter of the lubricant-oil outlet port, A: an arrow, B: an arrow, F: foreign substances, W: a width of the axial groove, and $W_G$: a width of the circumferential groove.

The invention claimed is:

1. A connecting rod bearing for crankshafts of internal combustion engines for rotatably supporting a crankpin of a crankshaft having an internal lubricant-oil passage, the connecting rod bearing consisting of a pair of semi-cylindrical bearings, one of which is an upper semi-cylindrical bearing positioned on a connecting rod side of a big end housing of a connecting rod, and the other of which is a lower semi-cylindrical bearing positioned on a cap side of the big end housing of the connecting rod, wherein the upper and lower semi-cylindrical bearings are provided with a reduced wall thickness region as a crush relief on a bearing inner surface adjacent to each of circumferential ends of the upper and lower semi-cylindrical bearings, wherein the upper semi-cylindrical bearing is so assembled to the big end housing of the connecting rod that a circumferential center of the upper semi-cylindrical bearing is aligned with an axis of the connecting rod, and wherein a circumferential groove is formed on the bearing inner surface so as to extend from each of circumferential ends of the upper and lower semi-cylindrical bearings toward the circumferential center of the bearings within a maximum circumferential angle range of 45 degrees and to divide the reduced wall thickness region into two sections, a width center line of the circumferential groove being in alignment with an opening center of a lubricant-oil outlet port of the internal lubricant-oil passage in the crankpin, which lubricant-oil outlet port exists on an outer surface of the crankpin, wherein a corner edge of the respective circumferential end continuous to the bearing inner surface is chamfered to form a slant surface, thereby two axial grooves being in fluid communication with the four circumferential grooves are defined over an entire axial width of the upper and lower semi-cylindrical bearings along the circumferential ends abutting against each other in a state that the pair of semi-cylindrical bearings are combined with circularly, wherein a circumferential length of the circumferential groove is larger than a circumferential length of the reduced wall thickness region, wherein a depth of the circumferential groove is made gradually smaller from the circumferential end toward the circumferential center, wherein a width of the circumferential groove is not smaller than one-quarter of a diameter of the lubricant-oil outlet port of the internal lubricant-oil passage in the crankpin and less than the diameter of the lubricant-oil outlet port, and wherein cross-sectional areas of the circumferential groove and the axial groove at a connection portion thereof satisfy the following equation (1):

$$\text{cross-sectional area of the circumferential groove} > \text{cross-sectional area of the axial groove} \quad (1).$$

2. The connecting rod bearing according to claim 1, wherein the depth of the circumferential groove within a circumferential length range from the circumferential end to at least one-half of the diameter of the lubricant-oil outlet port is 0.1 to 0.8 mm.

3. The connecting rod bearing according to claim 1, wherein the length of the circumferential groove satisfies the following equation (2):

$$\text{circumferential length of the circumferential groove} \geq \text{circumferential length of the wall thickness reduced region} + \text{one-half of the diameter of the lubricant-oil outlet port} \quad (2).$$

4. The connecting rod bearing according to claim 1, wherein the width of the circumferential groove satisfies the following equation (3):

$$\text{one-half of the diameter of the lubricant-oil outlet port} > \text{width of the circumferential groove} \geq \text{one-quarter of the diameter of the lubricant-oil outlet port} \quad (3).$$

5. The connecting rod bearing according to claim 1, wherein a bottom of the circumferential groove has an arc shape in cross section, and the width of the circumferential groove is made gradually smaller from the circumferential end toward the circumferential center of the semi-cylindrical bearing, and is not less than one-quarter of and less than one-half of the diameter of the lubricant-oil outlet port at a position distant by one-half of the diameter of the lubricant-oil outlet port from a groove end on the circumferential center side toward the circumferential end side.

6. A connecting rod bearing device for internal combustion engines comprising a connecting rod bearing rotatably supporting a crankpin which connects a connecting rod of an internal combustion engine to a crankshaft having an internal lubricant-oil passage, and a big end housing of the connecting rod for holding the connecting rod bearing, the connecting rod bearing consisting of a pair of semi-cylindrical bearings, one of which is an upper semi-cylindrical bearing positioned on a connecting rod side of the big end housing of the connecting rod, and the other of which is a lower semi-cylindrical bearing positioned on a cap side of the big end housing of the connecting rod, wherein the upper and lower semi-cylindrical bearings are provided with a reduced wall thickness region as a crush relief on a bearing inner surface adjacent to each of circumferential ends of the upper and lower semi-cylindrical bearings, wherein the upper semi-cylindrical bearing is so assembled to the big end housing of the connecting rod that a circumferential center of the upper semi-cylindrical bearing is aligned with an axis of the connecting rod, and wherein a circumferential groove is formed on the bearing inner surface so as to extend from each of circumferential ends of the upper and lower semi-cylindrical bearings toward the circumferential center of the bearings within a maximum circumferential angle range of 45 degrees and to divide the reduced wall thickness region into two sections, a width center line of the circumferential groove being in alignment with an opening center of a lubricant-oil outlet port of the internal lubricant-oil passage in the crankpin, which lubricant-oil outlet port exists on an outer surface of the crankpin, wherein a corner edge of the respective circumferential end continuous to the bearing inner surface is chamfered to form a slant surface, thereby two axial grooves being in fluid communication with the four circumferential grooves are defined over an entire axial width of the upper and lower semi-cylindrical bearings along the circumferential ends abutting against each other in a state that the pair of semi-cylindrical bearings are combined with circularly, wherein a circumferential length of the circumferential groove is larger than a circumferential length of the reduced wall thickness region, wherein a depth of the circumferential groove is made gradually smaller from the circumferential end toward the circumferential center, wherein a width of the circumferential groove is not smaller than one-quarter of a diameter of the lubricant-oil outlet port of the internal lubricant-oil passage in the crankpin and less than the diameter of the lubricant-oil outlet port, and wherein cross-sectional areas of the circumferential groove and the axial groove at a connection portion thereof satisfy the following equation (1):

$$\text{cross-sectional area of the circumferential groove} > \text{cross-sectional area of the axial groove} \quad (1).$$

* * * * *